(12) United States Patent
Flach et al.

(10) Patent No.: US 11,098,683 B2
(45) Date of Patent: Aug. 24, 2021

(54) FLUID CONDUIT COUPLING HAVING SECURING CLAMP

(71) Applicant: Mahle International GmbH, Stuttgart (DE)

(72) Inventors: Matthias Flach, Remseck (DE); Dieter Goldmann, Markgroeningen (DE); Samuel Kohler, Weil im Schoenbuch (DE); Thorsten Mueller, Benningen (DE); Katrin Schindele, Baiersbronn (DE); Eduard Seitz, Uhingen (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/764,833

(22) PCT Filed: Nov. 5, 2018

(86) PCT No.: PCT/EP2018/080085
§ 371 (c)(1),
(2) Date: May 15, 2020

(87) PCT Pub. No.: WO2019/096596
PCT Pub. Date: May 23, 2019

(65) Prior Publication Data
US 2020/0362801 A1 Nov. 19, 2020

(30) Foreign Application Priority Data
Nov. 16, 2017 (DE) .......................... 102017220448.6

(51) Int. Cl.
*F02M 35/10* (2006.01)
*F16L 37/088* (2006.01)

(52) U.S. Cl.
CPC .................. *F02M 35/10144* (2013.01); *F02M 35/10157* (2013.01); *F02M 35/10321* (2013.01); *F16L 37/0885* (2019.08)

(58) Field of Classification Search
CPC ... F16L 37/0885; F16L 37/088; F16L 37/091; F02M 35/10144
(Continued)

(56) References Cited

U.S. PATENT DOCUMENTS 4,244,608 A 1/1981 Stuemky
5,765,877 A 6/1998 Sakane et al.
(Continued)

FOREIGN PATENT DOCUMENTS

CH 702 954 A2 10/2011
CN 100529500 C 8/2009
(Continued)

OTHER PUBLICATIONS

English abstract for CH-702 954.
(Continued)

*Primary Examiner* — Matthew Troutman
*Assistant Examiner* — Fannie C Kee
(74) *Attorney, Agent, or Firm* — Fishman Stewart PLLC

(57) ABSTRACT

A fluid conduit coupling may include a tubular body, a connecting piece, and a securing clamp radially adjustable relative to the tubular body between a securing position and a release position. The connecting piece may have a securing groove extending in the circumferential direction, the tubular body may have a securing slot aligned radially to the securing groove when the connecting piece is inserted into the tubular body, and the securing clamp may have a securing web sticking out radially to the inside, and, in the securing position, radially engages with the securing groove through the securing slot, and, in the release position, does not radially engage with the securing groove. The tubular body may have at least one guide groove, and the securing
(Continued)

clamp may have at least one guide web sticking out radially and, at least in the securing position, radially engages with the associated guide groove.

15 Claims, 4 Drawing Sheets

(58) Field of Classification Search
USPC .......................................................... 285/308
See application file for complete search history.

(56) References Cited

U.S. PATENT DOCUMENTS

| | | | | |
|---|---|---|---|---|
| 6,065,779 | A | * | 5/2000 | Moner .................... B25B 27/10 285/23 |
| 7,828,338 | B2 | | 11/2010 | Kertesz et al. |
| 9,745,926 | B2 | | 8/2017 | Proettel et al. |
| 2005/0100273 | A1 | | 5/2005 | Kim et al. |
| 2014/0326223 | A1 | * | 11/2014 | Proettel ............ F02M 35/10209 123/559.1 |
| 2014/0338773 | A1 | | 11/2014 | French |
| 2015/0377396 | A1 | | 12/2015 | Rosin et al. |

FOREIGN PATENT DOCUMENTS

| | | |
|---|---|---|
| CN | 105980758 A | 9/2016 |
| DE | 695 29 927 T2 | 12/2003 |
| DE | 10 2004 012 870 A1 | 10/2005 |
| DE | 20 2006 009 144 U1 | 10/2007 |
| DE | 102007023987 A1 | 12/2007 |
| DE | 10 2014 102 662 A1 | 9/2015 |
| EP | 1 806 528 A1 | 7/2007 |
| EP | 2799751 A1 | 11/2014 |

OTHER PUBLICATIONS

English abstract for DE-10 2004 012 870.
English abstract for DE-10 2014 102 662.
Chinese Office Action dated Oct. 16, 2020 for copending Chinese Appl. No. 201880074259.7 (including English translation).
English abstract for CN105980758.
English abstract for DE1020070239870.

* cited by examiner

FLUID CONDUIT COUPLING HAVING SECURING CLAMP

CROSS-REFERENCE TO RELATED APPLICATIONS

This application claims priority to International Patent Application No. PCT/EP2018/080085 filed on Nov. 5, 2018, and German Patent Application No. DE 10 2017 220 448.6, filed on Nov. 16, 2017, the contents of which are hereby incorporated by reference in their entirety.

TECHNICAL FIELD

The present invention relates to a fluid conduit coupling for mechanically and fluidically coupling a fluid-conducting first component to a fluid-conducting second component. The invention further relates to a securing clamp for a fluid conduit coupling of this type. The invention furthermore relates to a charging device, which can be connected to a fresh air conduit of a fresh air system of an internal combustion engine by means of a fluid conduit coupling of this type. Lastly, the present invention also relates to a fresh air conduit of a fresh air system of an internal combustion engine, which can be connected to another fluid-conducting component by means of a fluid conduit coupling of this type.

BACKGROUND

In many areas of technology, it is required to fluidically and mechanically connect a first fluid-conducting component to a second fluid-conducting component. To be able to realize this easily, a fluid conduit coupling can be used. In particular in the case of internal combustion engines, preferably in motor vehicles, fluid conduit couplings of this type can be used, for example to connect fluid-conducting conduits to one another or to components, to which a fluid has to be supplied or from which a fluid has to be discharged. Fluid conduit couplings of this type are conceivable, for example, within a cooling circuit. Particularly advantageously, however, fluid conduit couplings of this type can be used in the area of a fresh air system. A fluid conduit coupling of this type is particularly suitable in the area of a charging device, in particular of an exhaust gas turbocharger, to connect a fresh air conduit to an inlet of the charging device and/or to connect a fresh air conduit to an outlet of the charging device.

So that a fluid conduit coupling of this type can be used as part of a series assembly, it has to be capable of being handled comparatively easily. In addition, it should also be capable of being used for areas, which are difficult to access or which are poorly visible, so that it can in particular be assembled blindly and/or without tools. A fluid conduit coupling of this type should furthermore be capable of being disassembled or separated again, respectively, comparatively easily, likewise preferably blindly and/or without tools.

EP 2 799 751 A1 describes a fluid conduit coupling of this type for connecting two fluid-conducting components by means of a securing clamp. The securing clamp thereby has a securing web and at least one guide web. The securing web engages through a securing slot in the first component and can engage with a securing groove in the second component. In addition, one or two guide webs are formed on the securing clamp, which each engage with a guide groove on an outside of the first component. A shifting of the securing clamp in the axial direction of the fluid conduit coupling is thus effectively prevented. In addition, the securing web can also be formed to be segmented, viewed in a circumferential direction. This means that it is not formed to be continuous, viewed in the circumferential direction, but divided into individual securing web segments.

DE 10 2004 012 870 A1 discloses a fluid conduit coupling for a washing liquid having tubular body, connecting piece, and locking element, as well as a contact flank, which ensures a positionally secure assembling.

Further fluid conduit couplings are known from DE 695 29 927 T2, US 2005/0 110 273 A1, US 2014/0 338 773 A1, US 2015/0 377 396 A1, and U.S. Pat. No. 4,244,608 A, CH 702 954 A2, DE 20 2006 009 144 U1, EP 1 806 528 A1, and DE 10 2014 102 662 A1.

SUMMARY

The present invention deals with the problem of specifying an improved embodiment for a fluid conduit coupling of this type or for the associated securing clamp, respectively, which is characterized by a high reliability, by easy handling, and by a cost-efficient producibility.

This problem is solved according to the invention by the subject matter of the independent claim. Advantageous embodiments are subject matter of the dependent claims.

The invention is based on the general idea that the respective guide web is formed to be segmented, viewed in a circumferential direction of the fluid conduit coupling. This means that it has breaks in the circumferential direction, is thus formed by several separate guide web portions or guide web segments, respectively. Excessive tensions or material stresses of the securing clamp, which is usually injection molded of a plastic, can thus be avoided, in particular in response to the assembly of the fluid conduit coupling. When assembling the securing clamp to the fluid conduit coupling, it can be hooked into the exterior first component, thus the tube or tubular body, in particular by means of a catch nose, can then be bent open slightly, and can be guided around the two components, which are already inserted into one another, and can then be quasi clipped into the tube by means of a second locking nose.

According to an advantageous embodiment, it can furthermore be provided that a reinforcing rib, which points to the outside, is formed on the securing clamp. Said reinforcing rib is formed in particular integrally with the securing clamp, for example, in an injection molding process. On this reinforcing rib, markings can serve to mark material number, tool clock, cavity, version and the like. The reinforcing rib serves to reinforce the area, which is essentially located opposite to the opening of the securing clamp. The reinforcing rib is accordingly arranged essentially centrally on the securing clamp. The securing clamp has a clamp opening for attaching to components, which are inserted into one another. The securing clamp is in particular designed to be C-shaped or U-shaped. The reinforcing rib is preferably arranged so as to be located diametrically opposite this clamp opening. This area is widened most in response to the assembly of the securing clamp, and the material is thus stressed to its tensile strength. A break of the securing clamp can be avoided by means of the reinforcing rib.

The reinforcing rib can also be formed as handle, so as to make it easier for a person, who assembles the securing clamp, to handle the latter.

The reinforcing rib is in particular formed so as to quasi taper, viewed in the radial direction. This means that it has a maximal radial extension to the outside, located opposite to a clamp opening, viewed in the circumferential direction, and then has a decreasing extension in the radial direction, viewed up to 180° in the circumferential direction. The 180° are to thereby be understood such that, located opposite to the clamp opening, the reinforcing ribs can each taper up to 90°, viewed in both circumferential directions. The decreasing extension can generally also be formed in a staged or step-like manner.

An embodiment, in the case of which the securing web is also segmented in the circumferential direction and accordingly has several securing web segments, which follow one after the other in the circumferential direction.

It goes without saying that the individual segments of the guide webs and/or of the securing webs do not necessary protrude inward at a right angle from the securing clamp, viewed in the radial direction, but that the transitions can be formed to be rounded, so as to avoid excessive material stresses.

In the case of a preferred design, the guide web segments and the securing web segments, viewed in the circumferential direction of the securing clamp, are arranged in such a way that they do not axially overlap one another. This means that, in top view in the axial direction of the fluid conduit coupling or of the securing clamp, respectively, the respective segments of guide web and securing web do not cover or overlap one another, respectively. In other words, they are arranged offset to one another in the circumferential direction. This simplifies in particular the production of the securing clamp as injection molded part, because no undercuts are required in the injection molding tool.

According to a further preferred design, a holding rib, which points radially to the inside, is in particular integrally molded to the securing clamp. The holding rib serves for the reinforcement and additionally for the force transmission between the securing clamp and the fluid conduit coupling. Viewed in the circumferential direction, the holding rib is in particular arranged opposite to the above-mentioned clamp opening. It can in particular be provided thereby that a circumferential portion of the securing clamp, which is located opposite to the clamp opening, is reinforced on the inside by means of this holding rib and on the outside by means of the above-mentioned reinforcing rib.

According to a further design of the invention, a securing protrusion is formed, in particular integrally, on the securing clamp and/or on the fluid conduit coupling. The securing protrusion is molded in such a way that an assembly, which is not positionally accurate, of the securing clamp to the fluid conduit coupling is avoided. If the securing clamp is attached to the fluid conduit coupling, for example so as to be rotated by 180°, the securing protrusion prevents that the securing clamp locks in place, and the person performing the assembly can determine and correct this. The securing protrusion can thereby cooperate, for example on the securing clamp, with a corresponding protrusion on the other component. In English, an assembly principle of this type is referred to as "fail-safe" or in Japanese as "poka-yoke".

The invention is based on the general idea of equipping the fluid conduit coupling with a tubular body, a connecting piece, which can be inserted therein, and with a securing clamp, wherein the connecting piece can be inserted into the tubular body, while the securing clamp is arranged on the outside of the tubular body and can be radially adjusted between a securing position and a release position relative to the tubular body. Connecting piece, tubular body, and securing clamp thereby form three separate components. In the release position of the securing clamp, the connecting piece, which is inserted into the tubular body, can be pulled out of the tubular body. In the securing position of the securing clamp, in contrast, the connecting piece, which is inserted into the tubular body, cannot be pulled out of the tubular body. It is clear thereby that only normal pulling forces, which lie below a failure limit of the involved components, are to be applied for pulling out. In other words, the connecting piece can be pulled out of the tubular body in a non-destructive manner in the release position, while this is not possible in the securing position. By applying excessive misuse forces, a pull-out of the connecting piece from the tubular body in the securing position of the securing clamp inevitably leads to a destruction of or to damages to at least one of the three components. While the connecting piece can be pulled out of the tubular body without destruction only in the release position of the securing clamp, it can be provided according to a preferred embodiment that the connecting piece can always be inserted into the tubular body, regardless of whether the securing clamp assumes its securing position or its release position. When the securing clamp is adjusted into the securing position, the insertion of the connecting piece into the tubular body can effect a radial displacement of the securing clamp relative to the tubular body, which takes place opposite to the spring forces of the securing clamp, so that the securing clamp is tensioned quasi elastically. If the connecting piece then reaches the provided axial penetration position in the tubular body, the securing clamp can radially spring back, driven by its elastic return spring force, and can automatically move into its securing position. The assembly can be significantly simplified thereby.

It is provided in detail that the tubular body can be attached to the first component or is present on the first component, while the connecting piece can be attached to the second component or is present thereon. The securing clamp surrounds the tubular body over more than 180° in a circumferential direction, so that it is secured in a self-locking manner on the tubular body in the securing position or is clamped thereto, respectively. To realize the securing position and the release position, the connecting piece has, on its outside located radially on the outside, a securing groove, which extends in the circumferential direction. The tubular body is equipped with a securing slot, which extends in the circumferential direction and which is aligned radially to the securing groove of the connecting piece when the connecting piece is inserted into the tubular body. While the securing groove generally does not penetrate a cylindrical wall of the connecting piece, the securing slot passes radially through a cylindrical wall of the tubular body. On its radially internal inside, the securing clamp now has a securing web, which sticks out radially to the inside and which extends in the circumferential direction and which, in the securing position, radially engages with the securing groove through the securing slot. To transfer the securing clamp from its securing position into its release position, it is adjusted radially to the outside relative to the tubular body to the extent that, in the release position, the securing web no longer radially engages with the securing groove. The radial engagement of the securing web with the securing groove results in an axial positive connection, which axially fixes the connecting piece to the securing clamp. The engagement of the securing web with the securing slot furthermore results in an axial positive connection, which axially fixes the securing clamp to the tubular body, so that the connecting piece is ultimately also fixed to the tubular body in a positive manner in the axial direction via the securing clamp. By pulling the securing web out of the securing groove, the connecting piece is now released relative to the securing clamp and thus relative to the tubular body, while the securing clamp remains fixed on the tubular body at least in the axial direction. The fluid conduit coupling introduced here can be handled very easily, because only the securing clamp has to be radially adjusted with respect to the tubular body.

According to an advantageous embodiment, the securing web can also be arranged in the securing slot in the release position. In the release position, a predetermined axial relative position between securing clamp and tubular body can also be maintained, which simplifies the assembly. The securing clamp thus also remains on the tubular body in the release position.

In the case of another embodiment, the securing web can extend over more than 90° on both sides in the circumferential direction, starting at a longitudinal central plane, wherein a radially measured web height in web end portions, which go beyond the 90°, is reduced or decreases in the direction of a web end. It is attained with this construction that, in the release position, the securing web can no longer radially protrude into the securing groove in the area of its web end portions, which form the area of the securing web, which goes beyond the 90°, from the longitudinal central plane, and in particular remains within the securing slot. It is ensured in this way that, in the release position, the connecting piece can be pulled out of the tubular body in the case of a simple geometry of the securing clamp. A decreasing web height can be attained, for example, in that, in the area of the web end portions, an inner radius on an inner edge of the securing web located radially on the inside is greater in the area of the web end portions than in the areas up to the 90°, starting at the longitudinal central plane. It is likewise possible to provide a straight course for the web inner edge in the area of the web end portions and to orient it in particular in such a way that, in the release position, the respective inner edge extends parallel to the radial adjusting direction of the securing clamp.

According to another advantageous embodiment, the connecting piece can have, on its outside, an insertion contour, which extends in the circumferential direction and which can be designed, for example, as bevel or insertion bevel or the like. The securing clamp is advantageously designed in a radially spring-elastic manner in such a way that, when the securing clamp is adjusted into the securing position, the connecting piece can be inserted into the tubular body. In other words, the fluid conduit coupling introduced here provides for an insertion of the connecting piece into the tubular body when the securing clamp is adjusted into the securing position, whereby, when reaching the provided insertion position, the securing of the connecting piece in the tubular body automatically takes place simultaneously. In detail, the securing web can be displaced radially to the outside when inserting the connecting piece into the tubular body prior to reaching a predetermined insertion depth through the insertion contour of the connecting piece, so that, upon reaching the predetermined insertion depth, said securing web automatically locks in place in the securing groove. This is attained by means of a suitable matching of the insertion contour to the securing web in connection with the spring elasticity of the securing clamp, so that, when being inserted, the connecting piece can widen the securing clamp to the extent that it can be guided axially past the securing web, until it automatically engages with the securing groove due to the spring force of the securing clamp. This measure leads to an extreme simplification of the assembly.

In the case of another embodiment, the tubular body can have, on its outside, two disengaging notches, which extend axially and with which one circumferential end of the securing clamp, in the release position thereof, radially engages in each case. When transferring the securing clamp from its securing position into its release position, it is elastically widened, so that the circumferential ends radially engage with the disengaging notches in a pre-stressed manner and thus effect a positioning of the securing clamp relative to the tubular body. In other words, the securing clamp can be automatically held in the release position on the tubular body with the help of the disengaging notches, which likewise facilitates the assembly as well as the disassembly. The locking between the circumferential ends and the disengaging notches can be overcome by slight pressure on the securing clamp, so that the securing clamp automatically snaps back into its securing position, driven by the spring elasticity thereof.

In the case of another advantageous embodiment, the securing web can have at least one web break or at least one radial web slot in the circumferential direction. The desired radial elasticity of the securing clamp can be set thereby. While a web break extends over the entire radial height of the securing web, a web slot interrupts the securing web only over a part of its total radial height.

Several web breaks or web slots of this type, respectively, which are preferably distributed symmetrically in the circumferential direction, can advantageously be provided. In the alternative, it can also be provided that only a single web break or only a single web slot, respectively, is provided, which is then located in the area of the longitudinal central plane of the securing clamp or of the securing web, respectively.

In the case of another advantageous embodiment, the securing slot can have a slot break, which is arranged centrally between circumferential ends of the securing slot. Complementary thereto, the securing web can then have a web break such that the slot break radially engages with the web break to form an anti-rotation protection between securing clamp and tubular body. Due to the anti-rotation protection between securing clamp and tubular body realized in this way, the securing clamp can be set reliably between the securing position and the release position.

According to another advantageous embodiment, the tubular body can have, on its outside, at least one guide groove, which extends in the circumferential direction. Complementary thereto, the securing clamp can have, on its inside, at least one guide web, which sticks out radially to the inside and which likewise extends in the circumferential direction and which, at least in the securing position, radially engages with the associated guide groove. An additional axial positive connection between securing clamp and tubular body, which improves the axial fixation between securing clamp and tubular body, is realized with the help of the guide groove and the guide web engaging therein.

In the case of another advantageous embodiment, at least one radial seal, which extends in a closed manner in the circumferential direction, can be provided between an inside of the tubular body and the outside of the connecting piece. The fluid conduit coupling can thereby be sealed to the outside against the fluid, which is to be conducted. A radial seal of this type can thereby be placed into a circumferential groove, which can generally be arranged on the inside of the tubular body, but preferably on the outside of the connecting piece.

According to an advantageous further development, the tubular body can have, axially adjacent to a radial seal of this type, a positioning slot, which extends in the circumferential direction. On its inside, axially spaced apart from the securing web, the securing clamp can now have a positioning web, which sticks out radially to the inside and which likewise extends in the circumferential direction and which, in the securing position, protrudes through the positioning slot radially beyond the inside of the tubular body and forms an axial stop for the radial seal. With the axial stop, the radial seal is positioned relative to the tubular body in the axial direction. The positioning web engaging with the positioning slot simultaneously effects an axial positive connection for axially fixing the securing clamp to the tubular body.

In the case of another embodiment, the securing clamp can have, on its circumferential ends, a handle element each for manually adjusting the securing clamp in the release position thereof. The handling of the fluid conduit coupling is simplified with the help of handle elements of this type, for example so as to be able to pull the connecting piece out of the tubular body. A handle element of this type can in particular be molded integrally on the securing clamp.

In the case of another advantageous embodiment, the fluid conduit coupling can be an air conduit coupling of a fresh air system for supplying fresh air to internal combustion chambers of an internal combustion engine, in particular of a motor vehicle, and can serve to mechanically and fluidically couple an air-conducting first component to an air-conducting second component. In the case of a charged internal combustion engine, this fluid conduit coupling can be located on the low pressure side or on the high pressure side. It can in particular be used to connect a fresh air conduit to a compressor of an exhaust gas turbocharger on the inlet side or on the outlet side.

In the case of another advantageous embodiment, the securing web and the securing slot can in each case extend over less than 360° in the circumferential direction, while the securing groove extends over 360° in the circumferential direction, thus circumferentially in a completely closed manner. It is possible thereby to insert the connecting piece into the tubular body in any rotational position. It is further possible to rotate the connecting piece, which is inserted into the tubular body, relative to the tubular body in the circumferential direction. Securing web and securing slot extend, for example, over approximately 270°. The guide groove, which may be present, and the associated guide web as well as the positioning slot, which may be present, and the associated positioning web extend over less than 360° in the circumferential direction, for example likewise over approximately 270°.

In the case of another advantageous embodiment, the tubular body can be integrally molded on the first component. In addition or in the alternative, it can be provided that the connecting piece is integrally molded on the second component. The integral construction reduces the number of components, which are to be installed, which facilitates the handling and the assembly.

The tubular body and the securing clamp can preferably be made of plastic, wherein the same plastic can generally be used here. The connecting piece, in contrast, can be made of plastic or of metal. If the connecting piece is made of plastic, this can preferably be a fiber-reinforced plastic.

According to another advantageous embodiment, the first component can be a low pressure air conduit of a fresh air system of a charged internal combustion engine, while the second component is a compressor inlet of a charging device arranged in the fresh air system. In the alternative, the first component can be a high pressure air conduit of a fresh air system of a charged internal combustion engine, while the second component is then a compressor outlet of a charging device arranged in the fresh air system.

A charging device according to the invention, which can in particular be an exhaust gas turbocharger and which is suitable for a fresh air system of an internal combustion engine, is equipped with a compressor inlet and with a compressor outlet, wherein the compressor inlet and/or the compressor outlet has a connecting piece of a fluid conduit coupling of the above-described type, so that it can be connected to a low pressure air conduit or to a high pressure air conduit, respectively, by means of a fluid conduit coupling of this type.

A fresh air conduit according to the invention of a fresh air system of an internal combustion engine has, on at least one of its ends, a tubular body of a fluid conduit coupling of the above-described type, so that this fresh air conduit can be connected to a different component of the internal combustion engine by means of a fluid conduit coupling of this type.

A securing clamp according to the invention, which is adapted for a use in a fluid conduit coupling of this type, is designed as open ring, in particular in a C-shaped manner, and has a securing web and at least one guide web, which is segmented in the circumferential direction.

Further important features and advantageous of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
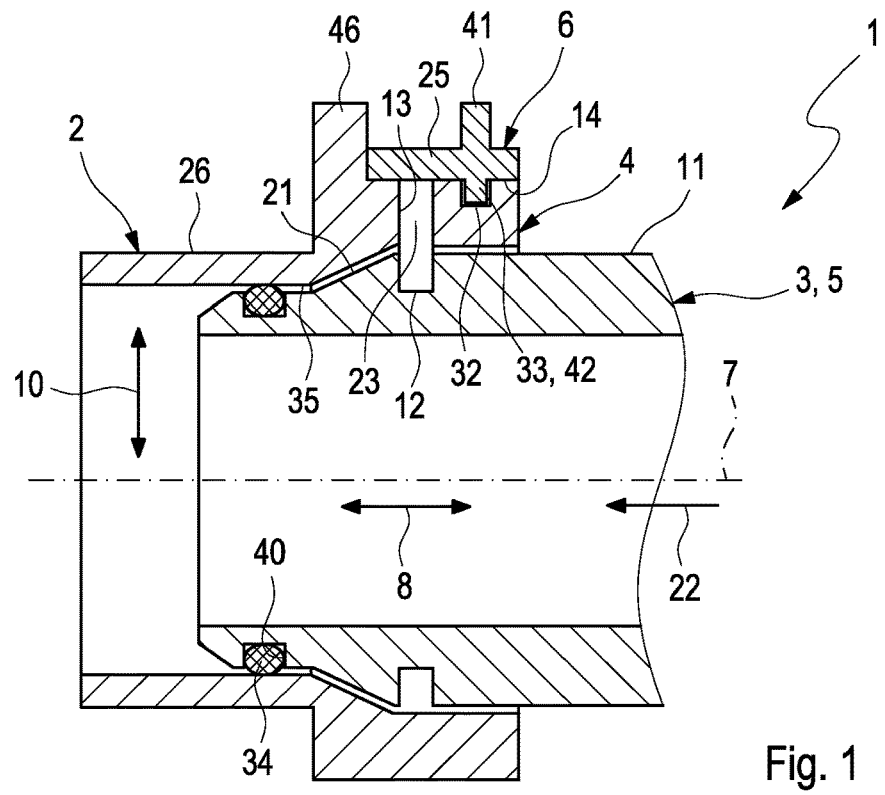
FIG. 1 shows a longitudinal section through a fluid conduit coupling in the area of sectional lines I-I in FIG. 8.
Figure 2:
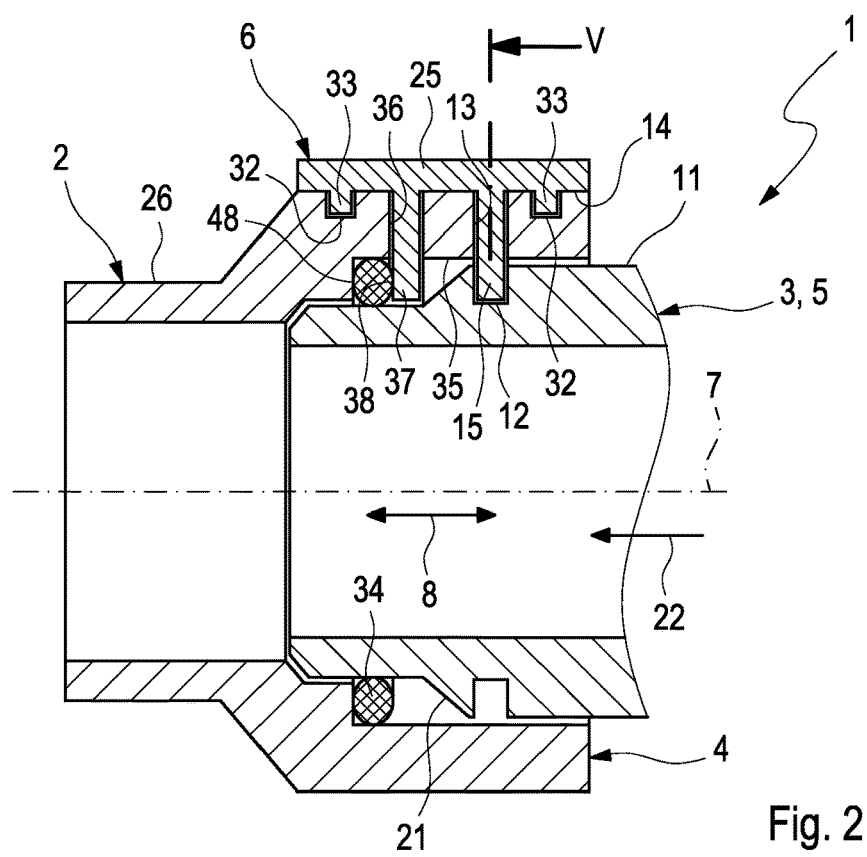
FIG. 2 shows a longitudinal section as in FIG. 1, but in the case of a different embodiment of the fluid conduit coupling.
Figure 7:
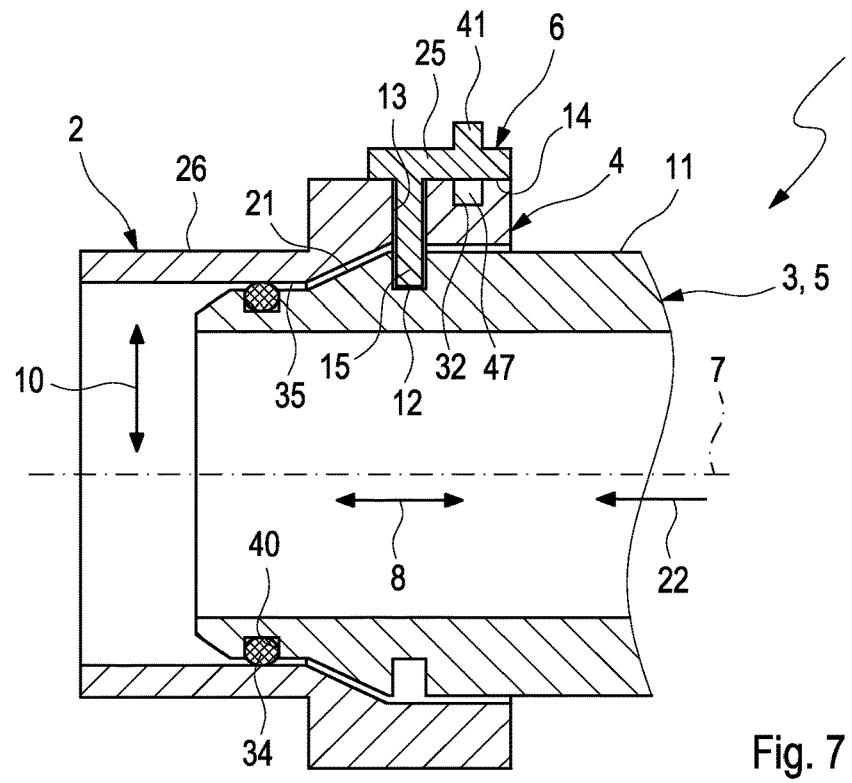
FIG. 7 shows a longitudinal section as in FIG. 1, but in the area of the sectional lines VII-VII in FIG. 8.

According to FIGS. 1, 2, and 7, a fluid conduit coupling 1, with the help of which a fluid-conducting first component 2 can be mechanically and fluidically coupled to a fluid-conducting second component 3, having a tubular body 4, a connecting piece 5, and a securing clamp 6. In the case of the examples shown here, the tubular body 4 is integrally molded on the first component 2. The tubular body 4, however, can generally also be a separate component, which can be attached to the first component 2 in a suitable manner. In the case of the embodiment shown here, the connecting piece 5 is integrally molded on the second component 3. However, an embodiment, in the case of which the connecting piece 5 is a separate component, which can be attached to the second component 3 in a suitable manner, is generally also conceivable. In any case, however, the securing clamp 6 is a separate component with respect to the first and second component 2, 3 or with respect to the tubular body 4 and the connecting piece 5, respectively.

The tubular body 4 has a longitudinal central axis 7, which defines an axial direction 8, which runs parallel to the longitudinal central axis 7. The connecting piece 5 can be inserted coaxially into the tubular body 4 and is illustrated in the inserted state in FIGS. 1, 2, and 7. The securing clamp 6 is furthermore arranged on the outside of the tubular body 4 and surrounds the tubular body 4 over more than 180°, e.g. over approximately 270°, in a longitudinal direction 9, which is suggested by a double arrow in FIGS. 3 to 6 and 9. With respect to the tubular body 4, the securing clamp 6 can be adjusted between a securing position shown in FIG. 5 and a release position shown in FIG. 6 in a radial direction 10. In the securing position according to FIG. 5, which is also reproduced in FIGS. 1 and 2, the connecting piece 5, which is inserted into the tubular body 4, is secured to the tubular body 4 with the help of the securing clamp 6, so that the connecting piece 5 cannot be pulled out of the tubular body 4 without destruction of the connecting piece 5 and/or of the securing clamp 6 and/or of the tubular body 4. In contrast, the connecting piece 5 can be pulled out of the tubular body 4 without any problems in the release position.

On its outside 11, which is located radially on the outside, the connecting piece 5 has a securing groove 12, which extends in the circumferential direction 9. The tubular body 4 has a securing slot 13, which also extends in the circumferential direction 9 and which is aligned radially to the securing groove 12 when the connecting piece 5 is inserted into the tubular body 4. On its inside 14, which is located radially on the inside, the securing clamp 6 has a securing web 15, which sticks out radially to the inside and which likewise extends in the circumferential direction 9. In the securing position, the securing web 15 extends through the securing slot 13 and furthermore radially engages with the securing groove 12. In the release position, in contrast, the securing web 15 is adjusted radially to the outside to the extent that it can no longer radially engage with the securing groove 12. This context is reflected in FIGS. 5 and 6. In the securing position according to FIG. 5, the securing web 15 radially engages with the tubular body 4 relatively deeply. In contrast, the securing web 15, in the release position according to FIG. 6, cannot radially engage so deeply with the tubular body 4. For the sake of clarity, the connecting piece 5 is omitted in the cross sections of FIGS. 5 and 6. It can be seen that, in the release position according to FIG. 6, the securing web 15 is also arranged in the securing slot 13.

Figure 3:
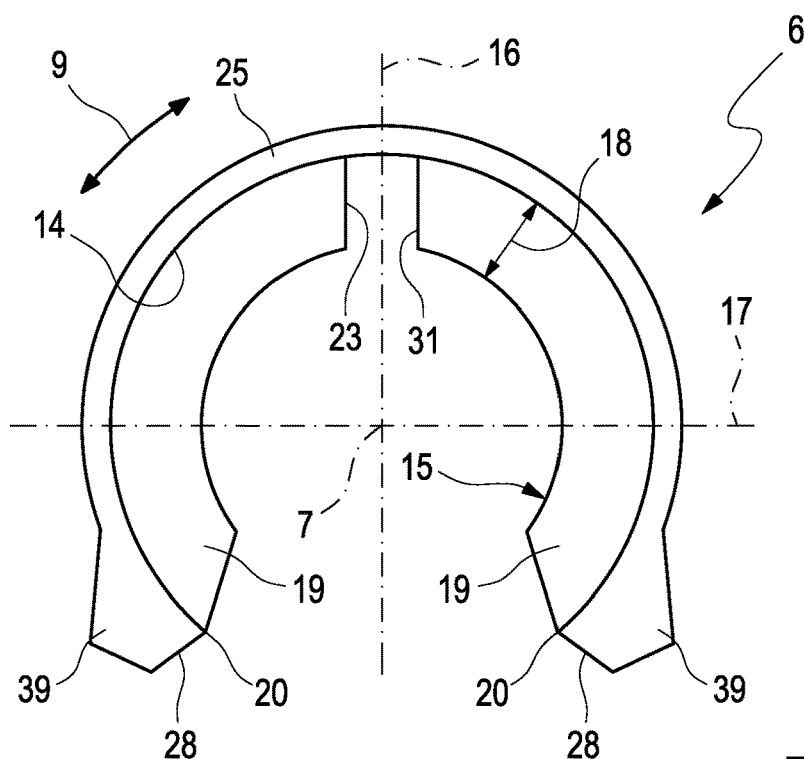
FIG. 3 shows an axial view of a conventional securing clamp of the fluid conduit coupling.
Figure 4:
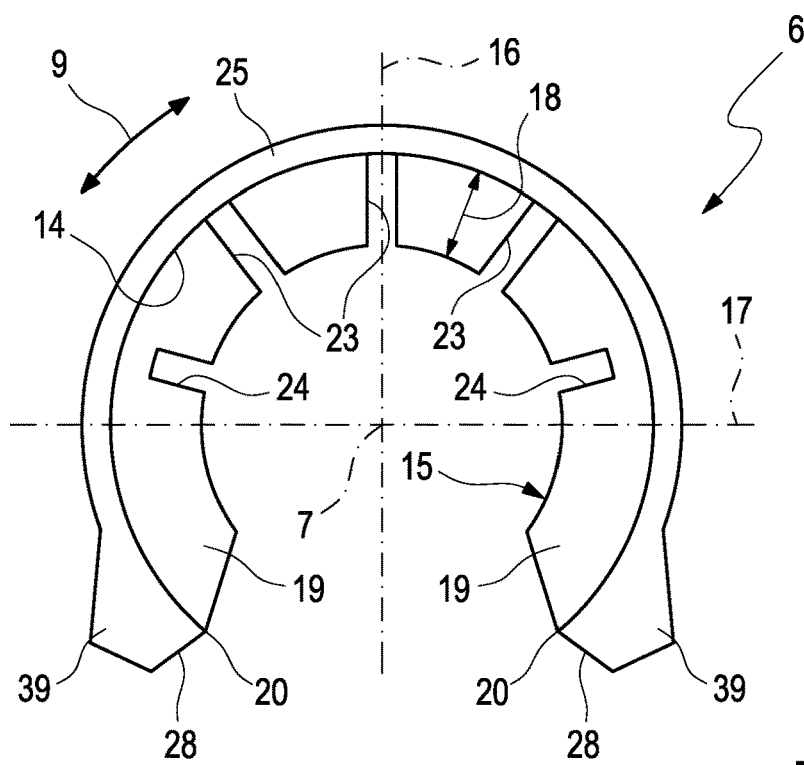
FIG. 4 shows an axial view as in FIG. 3, but in a different embodiment of the conventional securing clamp.

According to FIGS. 3 to 6 and 8, the securing web 15 extends over more than 90° on both sides in the circumferential direction 9, starting at a longitudinal central plane 16 of the securing clamp 6. A normal plane 17 intersecting the longitudinal central plane 16 in the longitudinal central axis 7 suggests the 90° areas, which start at the longitudinal central plane 16. The securing web 15 has a radially measured web height 18, which is reduced or decreases in the direction of a web end 20 in web end portions 19, which go beyond the 90° areas. In the example of FIGS. 3 and 4, the securing web 15 has, in the respective web end portion 19, a beveled web end 20, which has a single, straight area. In the case of the embodiment shown in FIGS. 5 and 6, the respective web end 20 is beveled in two stages. Due to the reduction of the web height 18 in the respective web end portion 19, it is attained that the securing web 15, in the release position according to FIG. 6, can no longer engage with the securing groove 12 of the connecting piece 5. The securing web 15 can then in particular only protrude slightly beyond the securing slot 13, which is suggested on the right in FIG. 6, or can no longer protrude beyond the securing slot 13, which is illustrated on the left in FIG. 6.

According to FIGS. 1, 2, and 7, the connecting piece 5 can have, on its outside 11, an insertion contour 21, which extends in the circumferential direction 9 and which is embodied as cone here, which tapers in an insertion direction 22, in which the connecting piece 5 can be inserted into the tubular body 4. The securing clamp 6 is designed so as to be radially spring-elastic, which can be realized, for example, by means of a corresponding material selection. In addition or in the alternative, measures, which will be described in more detail below with reference to FIGS. 3, 4, and 8, for improving or for providing the desired radial spring elasticity of the securing clamp 6, respectively, can be realized. In any case, the securing clamp 6 is advantageously configured to be spring elastic such that the connecting piece 5 can be inserted into the tubular body 4 when the securing clamp 6 is adjusted in the securing position. The insertion contour 21 thereby axially strikes the securing web 15, which protrudes radially to the inside, and effects a displacement of the securing web 15 oriented radially to the outside, which then takes place against a spring force of the securing clamp 6. As soon as the connecting piece 5 reaches a predetermined insertion depth in the tubular body 4, the securing groove 12 is aligned with the securing web 15, whereby the securing web 15 can automatically lock in place with the securing groove 12. The securing web 15 is thereby driven radially to the inside by the spring force of the securing clamp 6.

According to FIG. 1, a securing protrusion 46, which sticks out radially and against which the securing clamp 6 rests axially, can also be formed on the first component 2 or the tubular body 4, so that the securing protrusion 46 prevents an axial displacement of the securing clamp 6 in the direction of the first component 2. The securing protrusion 46 simultaneously also serves to avoid an incorrect assembly, because it specifies the position of the securing clamp 6 in the axial direction and the securing web 15, for example, can thus be engaged with the securing groove 12 in a positionally accurate manner. In addition or in the alternative, a further mechanical lock can generally also be provided, in order to prevent an axial displacement of the securing clamp in the direction of the second component 3 or of the connecting piece 5, respectively.

Figure 8:
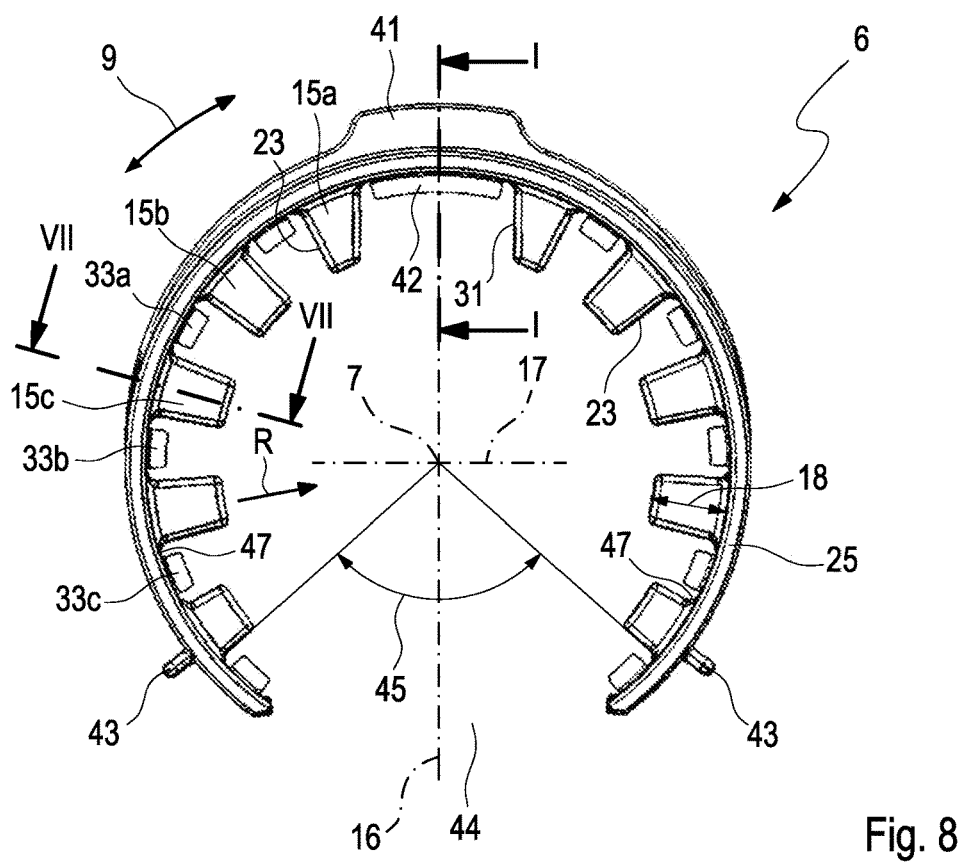
FIG. 8 shows a top view onto a securing clamp according to the invention of the fluid conduit coupling.

As can be gathered from FIGS. 3, 4, and 8, the securing web 15 can have at least one web break 23 in the circumferential direction 9. In addition or in the alternative, the securing web 15 according to FIG. 4 can have at least one radial web slot 24. While a web break 23 of this type extends over the entire radial height 18 of the securing web 15, the respective web slot 24, which is open radially to the inside, is dimensioned to be smaller in the radial direction than the radial height 18 of the securing web 15. In the example of FIG. 3, the only web break 23 is positioned symmetrically to the longitudinal central plane 16. Several web breaks 23 and furthermore several web slots 24 are provided in FIG. 4, which can advantageously be distributed symmetrically to the longitudinal central plane 16 in the circumferential direction 9. Several breaks 23 are likewise provided in FIG. 8 such that a segmentation of the securing web 15 follows, which will be described in more detail below. The respective web break 23 or the respective web slot 24, respectively, shifts the force flow paths, which are oriented in the circumferential direction 9 in the securing web 15, radially to the outside into a strip-shaped base body 25 of the securing clamp 6. The radial spring elasticity of the securing clamp 6 is improved thereby.

Figure 5:
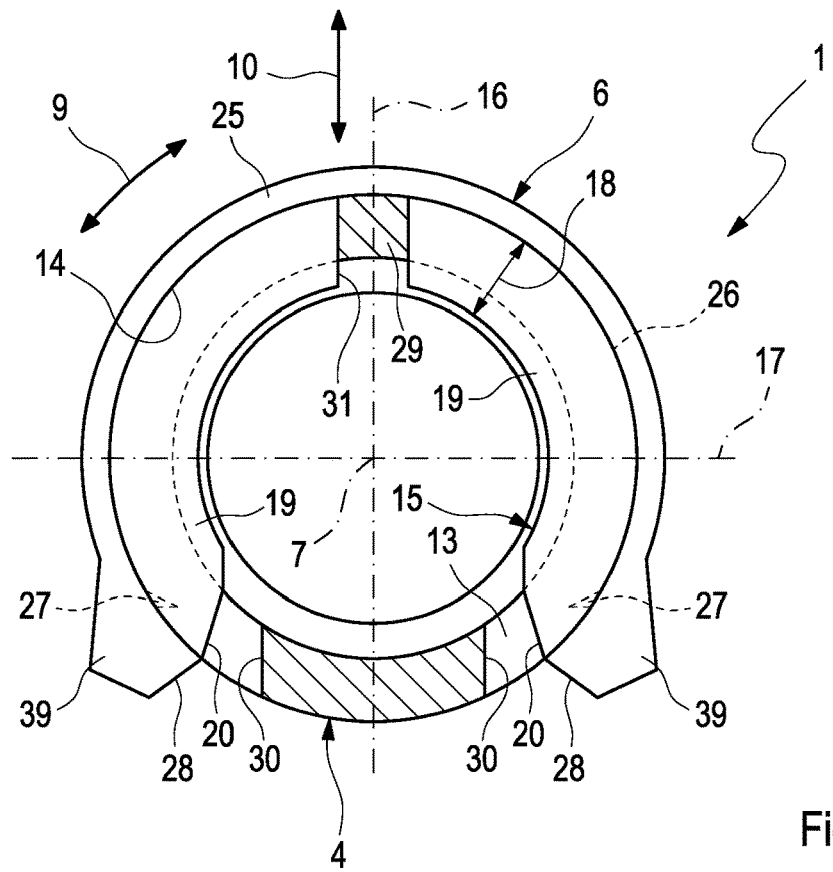
FIG. 5 shows a cross section of the fluid conduit coupling according to sectional lines V in FIG. 2 with the conventional securing clamp in a securing position.
Figure 6:
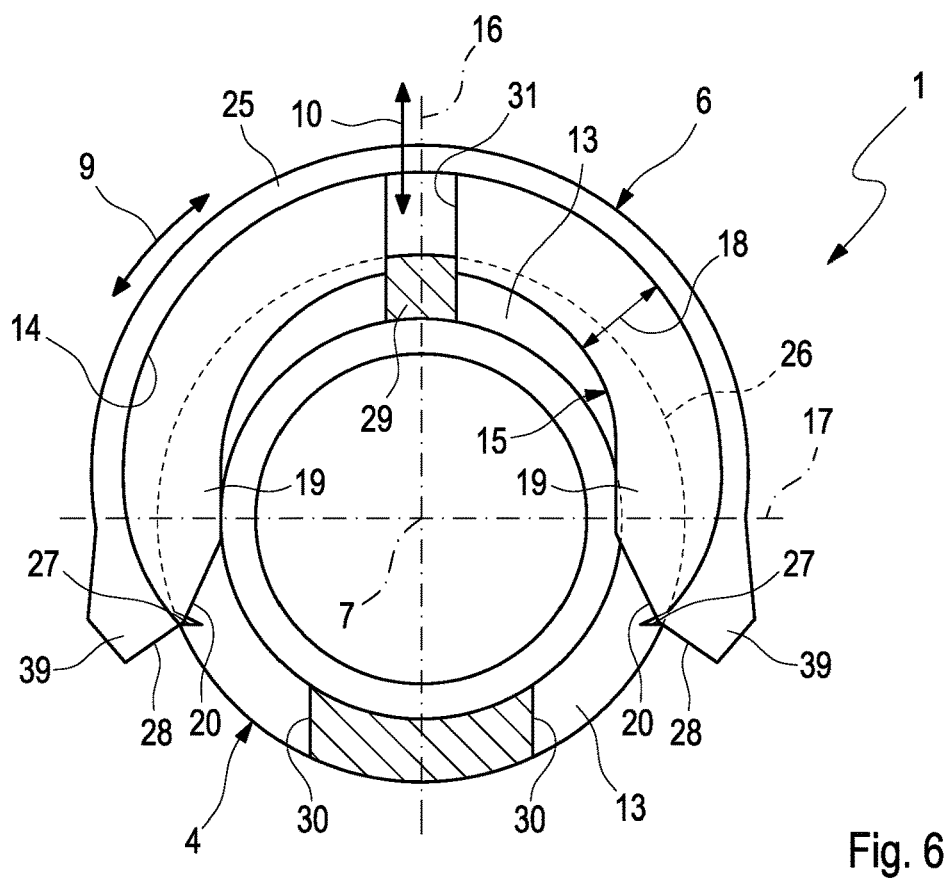
FIG. 6 shows a cross section as in FIG. 5, but with the conventional securing clamp in a release position.

According to FIGS. 5 and 6, the tubular body 4 can have, on its outside 26, which is located radially on the outside, two disengaging notches 27, which each extend axially, thus parallel to the longitudinal central axis 7. The disengaging notches 27 are positioned on the outside 26 of the tubular body 4 in such a way that, in the release position of the securing clamp 6, a circumferential end 28 of the securing clamp 6 can in each case radially engage with a respective one of the disengaging notches 27, which is illustrated in FIG. 6. In the release position, the securing clamp 6 is positioned on the tubular body 4 in a stable manner in this way, whereby it is particularly easy to manually disassemble the fluid conduit coupling 1 or to uncouple the two components 2, 3 from one another, respectively.

In the case of the embodiment shown in FIGS. 5 and 6, the securing slot 13 has a slot break 29, which is arranged essentially centrally between circumferential ends 30 of the securing slot 13, thus likewise arranged centrally with respect to the longitudinal central plane 16. Complementary to the slot break 29, the securing web 15 now has a web break 31, which is accordingly arranged centrally between circumferential ends 28 of the securing clamp 6. According to FIGS. 5 and 6, the slot break 29, which forms an axial web on the tubular body 4, radially engages with the web break 31, whereby an anti-rotation protection between the securing clamp 6 and the tubular body 4 is formed.

According to FIGS. 1, 2, and 7, the tubular body 2 can have, on its outside 26, at least one guide groove 32, which extends in the circumferential direction 9. Complementary thereto, the securing clamp 6 has, on its inside 14, at least one guide web 33, which sticks out radially to the inside. At least in the securing position, the respective guide web 33 radially engages with the associated guide groove 32. In the example of FIG. 2, two guide grooves 32, which run parallel to one another, are formed on the tubular body 4, while, complementary thereto, two guide webs 33, which run parallel to one another, are present on the securing clamp 6.

According to FIGS. 1, 2, and 7, at least one radial seal 34, which extends in a closed manner in the circumferential direction 9, can be provided, which can be realized, for example, with the help of an O ring. The radial seal 34 is thereby positioned between an inside 35 of the tubular body 4 facing the connecting piece 5 and the outside 11 of the connecting piece 5, in order to seal the fluid-conducting interior of connecting piece 5 and tubular body 4 against a surrounding area of the fluid conduit coupling 1.

In the preferred embodiment shown in FIG. 2, the tubular body 4 has, axially adjacent to the radial seal 34, a positioning slot 36, which is provided in addition to the securing slot 13 in the circumferential direction 9. In addition to the securing web 15, the securing clamp 6 has, on its inside 14, a positioning web 37, which extends in the circumferential direction 9 and which sticks out radially to the inside. In the securing position, the positioning web 37 extends radially through the positioning slot 36 and thereby protrudes radially beyond the inside 35 of the tubular body 4 to the extent that it forms an axial stop 38 for the radial seal 34. A ring step 48, on which the radial seal 34 can likewise be supported axially as well as radially, is formed on the inside of the tubular body 4 located axially opposite to said axial stop 38. The positioning slot 36 extends parallel to the securing slot 13. The positioning web 37 extends parallel to the securing web 15.

In contrast to FIG. 2, FIGS. 1 and 7 show a variation of the embodiment shown in FIG. 2 with regard to the positioning of the radial seal 34. A circumferential groove 40, which revolves in a closed manner in the circumferential direction and into which the radial seal 34 is inserted, is formed in this case on the connecting piece 5. The radial dimensioning of the securing web 15 can preferably be selected in such a way that the radial seal 34 does not come into contact with the securing web 15 when the connecting piece 5 is inserted into the tubular body 4. In other words, the outer cross section of the radial seal 34, which is inserted into the circumferential groove 40, is smaller than the inner cross section of the securing web 15.

According to FIGS. 3 to 6, the securing clamp 6 can have, on its circumferential ends 28, a handle element 39 each, with the help of which a manual adjustment of the securing clamp 6 is simplified. The respective handle element 39 forms a radial thickening of the circumferential end 28. The respective handle element 39 is in particular integrally molded on the securing clamp 6.

As can in particular be gathered from FIGS. 5 and 6, the securing web 15 and the securing slot 13 in each case extend over less than 360°, namely for example over approximately 270°, in the circumferential direction 9. In contrast, the securing groove 12 according to FIGS. 1 and 2 extend over 360° in the circumferential direction 9, thus completely circumferentially in the circumferential direction 9. The connecting piece 5 can thus be inserted into the tubular body 4 in every rotational position.

The fluid conduit coupling 1 is advantageously an air conduit coupling of a fresh air system, with the help of which fresh air is supplied to combustion chambers of an internal combustion engine, which can in particular be arranged in a motor vehicle. An air conduit coupling 1 of this type then serves to mechanically and fluidically couple an air-conducting first component 2 to an air-conducting second component 3. The first component 2 can be, for example, a low pressure air conduit of a fresh air system of a charged internal combustion engine, while the second component 3 can be a compressor inlet of a charging device arranged in the fresh air system. In the alternative, the first component 2 can also be a high pressure air conduit of a fresh air system of a charged internal combustion engine, while the second component 3 can then be a compressor outlet of a charging device arranged in the fresh air system. The second component 3 can thus in particular be formed by a compressor inlet or by a compressor outlet of a compressor of an exhaust gas turbocharger, which is equipped with the connecting piece 5. The first component 2 can then in particular be a fresh air conduit of a fresh air system of an internal combustion engine, which has a tubular body 4 of this type at least on one of its ends, for example to be able to easily connect the fresh air conduit to the above-mentioned compressor inlet or to the above-mentioned compressor outlet.

According to FIG. 8, the securing clamp 6 of the fluid conduit coupling 1 essentially forms an open ring. The securing clamp 6 thereby encompasses for example 270° or more of a circular arc. The securing clamp 6 is thus designed in a C-shaped manner. In the alternative, for example a U-shaped design is also possible. In any case, the securing clamp 6 has a clamp opening 44. The securing clamp 6 is in particular formed as plastic injection molded part. It is, for example, a PA6GF30 plastic, thus a polyamide with glass fiber content, or a polypropylene plastic.

In the case of the securing clamp 6 introduced in FIG. 8, the respective guide web 33 is provided with several breaks 47 in the circumferential direction 9, whereby it is divided into several portions a, b, c . . . or segments a, b, c . . . , which will be referred to below as guide web segments 33a, b, c . . . . Optionally, the securing web 15 is also provided with several breaks 23 in the circumferential direction 9, whereby it is divided into several portions a, b, c . . . or segments a, b, c . . . , which will be referred to below as securing segments 15a, b, c . . . . The securing clamp 6 thereby thus has securing web segments 15a, b, c . . . , which face radially to the inside, as well as guide web segments 33a, b, c . . . . This means that the securing web 15 and the respective guide web 33 are each segmented or each have breaks 23 or 47, respectively, or gaps, viewed in the circumferential direction 9. In the example, the securing clamp 6 is preferably formed in such a way that it has an opening angle 45 of essentially 90°. The segmentation of the securing web 15 is thereby optionally provided in addition to the optional web break 31, which is described above.

In the preferred example, the securing web segments 15a, b, c . . . and the guide web segments 33a, b, c . . . are arranged in such a way, viewed in the circumferential direction 9, that they do not overlap one another, viewed in the axial direction 8 of the fluid conduit coupling 1. In this axial direction 8, the securing web segments 15a, b, c . . . and the guide web segments 33a, b, c . . . are arranged offset to one another, are thus located in different axial planes. In the viewing direction of FIG. 8, the guide web segments 33a, b, c . . . are located downstream from the securing web segments 15a, b, c . . . . In FIG. 8, the axial direction 8 is perpendicular to the drawing plane. The guide web segments 33a, b, c . . . are thus arranged quasi in the breaks 23 of the securing web 15 with respect to the axial direction 8. At the same time, the securing web segments 15a, b, c . . . are arranged quasi in the breaks 47 of the guide web 33.

It can be seen in FIG. 7 that the guide groove 32 is quasi empty in this section VII-VII, because a break 47 of the guide web 33 is located there, while the securing groove 13 is essentially filled by the respective securing web segment 15 a, b, c. This is due to the arrangement, which is offset radially and in the circumferential direction 9, of the guide web segments 33a, b, c . . . and of the securing web segments 15a, b, c . . . .

Analogously, FIG. 1 shows that the positioning slot 36 and the securing groove 12 are quasi empty in this section I-I, because a break 23 of the securing web 15 is located there, while the guide groove 32 is essentially filled by the respective guide web segment 33a, b, c. This is due to the arrangement, which is offset radially and in the circumferential direction 9, of the guide web segments 33a, b, c . . . and of the securing web segments 15a, b, c . . . .

The securing web segments 15a, b, c . . . can also be formed to be beveled in the circumferential direction 9., as clarified in the case of the webs 15a, 15b, so as not to jam in a disassembly position on the fluid conduit coupling 1. The bevels of the securing web portions 15a, b, c . . . can thereby be formed inclined, for example, by 10° to 20°, viewed in the radial direction R.

A reinforcing rib 41, which is arranged in particular so as to be located opposite to the clamp opening 44, is furthermore optionally formed, in particular integrally, on the radial outside of the securing clamp 6. The reinforcing rib 41 can be dimensioned to be smaller than the clamp opening 44 in the circumferential direction 9. As illustrated, however, the reinforcing rib 44 can also be formed in such a way that it has a maximum radial extension to the outside located opposite to the clamp opening 44 and then quasi tapers off towards both sides, viewed in the circumferential direction 9, thus decreasing in its radial extension and thus no longer protruding protruding over the securing clamp 6, viewed in the radial direction. As can be seen, the reinforcing rib 41 according to FIGS. 1 and 8 has a larger radial extension in section I-I than according to FIGS. 7 and 8 in section VII.

The reinforcing rib 41 is preferably formed symmetrically, viewed in the circumferential direction 9, it can generally also be formed asymmetrically. It is likewise possible that the reinforcing rib 41 is arranged at any position of the securing clamp 6, viewed in the circumferential direction 9. The area of maximal radial extension can in particular be formed as handle for grasping by a person for assembling the securing clamp 6. The largest bending forces usually appear in the area of largest radial extension in response to the widening of the securing clamp 6, which then decrease, viewed in the circumferential direction 9, so that the radial extension of the reinforcing rib 41 can also decrease either continuously or gradually here. Markings for the serial number, the material and the like of the securing clamp 6 can also be attached to the reinforcing rib 41, so as to be able to identify them easily. The reinforcing rib 41 preferably lies in the axial plane, in which the guide web segments 33a, b, c . . . lie as well. The reinforcing rib 41 can generally also be arranged in an axial plane of the securing web segments 33a, b, c . . . or in another axial plane on the outer circumference of the securing clamp 6.

A holding rib 42, which is arranged in particular so as to be located opposite to the clamp opening 44, is optionally formed, in particular integrally, on the radial inside of the securing clamp 6. Said holding rib serves for the force transmission and for the reinforcement of the securing clamp 6. The holding rib 42 is dimensioned to be smaller than the clamp opening 44 in the circumferential direction 9. The holding rib 42 is preferably also dimensioned to be smaller than the reinforcing rib 41 in the circumferential direction. The holding rib 42 is dimensioned to be smaller than the reinforcing rib 41 in the radial direction R. The holding rib 42 lies in the same axial plane here, in which the guide web segments 33 a, b, c . . . lie as well. In this respect, the holding rib 42 can also be perceived as central or centered guide web segment 33a, b, c . . . , but which is dimensioned so as to be larger than the other guide web segments 33a, b, c . . . in the circumferential direction 9.

All guide web segments 33a, b, c . . . are preferably arranged only on one side of the securing web segments 15a, b, c . . . , viewed in the axial direction. In other words, only one guide web 33 is provided and this one guide web 33 is segmented.

Handling protrusions 43 are in particular integrally molded on the securing clamp 6, in particular in the area of the clamp opening 44, in order to facilitate the manual attaching and locking or clipping to the fluid conduit coupling 1. These protrusions 43 point essentially perpendicular to the outside, for example viewed in the radial direction R, and can be formed by webs, which extend axially. Locking protrusions, which are not shown here, which cooperate with corresponding locking noses on the outside of the first component 2 or of the tube 4, respectively, can likewise be formed in the area of the clamp opening 44. The securing clamp 6 can thus be manually hooked into or locked in place on the locking nose of the tube 4 by means of a first locking protrusion, can then be widened slightly by means of the material elasticity, and can lastly be fixed in an assembly position by means of the second latching protrusion.

The guide web segments 33a, b, c . . . are dimensioned to be smaller than the securing web segments 15a, b, c . . . in the circumferential direction 9 and in the radial direction R. The guide web segments 33a, b, c . . . and the securing web segments 15a, b, c . . . can in each case also be formed equal in size, viewed in the circumferential direction 9.

A securing contour, which is not shown here, which can cooperate, for example, with the securing protrusion 46, which is illustrated in FIG. 1 and is formed on the first component 2, can likewise be formed, in particular integrally, on the securing clamp 6, so as to avoid an incorrect assembly. This securing contour can, for example, laterally encompass the securing protrusion in the circumferential direction 9. The securing protrusion 46 or the mentioned securing contour, respectively, prevents the locking of the securing clamp 6 in the incorrect assembly position.

The invention claimed is:

1. A fluid conduit coupling for mechanically and fluidically coupling a fluid-conducting first component to a fluid-conducting second component, comprising:
   a tubular body, which is part of the first component or is attachable to the first component;
   a connecting piece, which is insertable coaxially into the tubular body and which is part of the second component or is attachable to the second component; and
   a securing clamp, which is arranged on an outside of the tubular body and which surrounds the tubular body over more than 180° in a circumferential direction, and which is radially adjustable relative to the tubular body between a securing position, in which the connecting piece, which is inserted into the tubular body, cannot be pulled out of the tubular body, and a release position, in which the connecting piece, which is inserted into the tubular body, is able to be pulled out of the tubular body;
   wherein the connecting piece has, on an outside, a securing groove, which extends in the circumferential direction;
   wherein the tubular body has a securing slot, which extends in the circumferential direction and which is aligned radially to the securing groove when the connecting piece is inserted into the tubular body;
   wherein the securing clamp has, on an inside, a securing web, which sticks out radially to the inside, which extends in the circumferential direction, which, in the securing position, radially engages with the securing groove through the securing slot, and which, in the release position, does not radially engage with the securing groove;
   wherein the tubular body has, on an outside, at least one guide groove, which extends in the circumferential direction;
   wherein the securing clamp has, on the inside, at least one guide web, which sticks out radially to the inside and which, at least in the securing position, radially engages with the associated guide groove;
   wherein the securing web is formed to be segmented in the circumferential direction and has several securing web segments;
   wherein the at least one guide web is formed to be segmented in the circumferential direction and has several guide web segments;
   wherein, viewed in an axial direction of the fluid conduit coupling, the securing web segments and the guide web segments do not overlap one another in the circumferential direction;
   wherein the securing clamp is made without undercuts in an injection molding tool as an injection molded part made of plastic; and
   wherein, on a radial outside, the securing clamp is equipped with a reinforcing rib, which extends in the circumferential direction, wherein, viewed in the circumferential direction, the reinforcing rib has an extension, which decreases up to 180°, viewed from a maximal extension located opposite to a clamp opening in the circumferential direction.

2. The fluid conduit coupling according to claim 1, wherein, on the radial inside, the securing clamp is equipped with a holding rib, which extends in the circumferential direction.

3. The fluid conduit coupling according to claim 2, wherein:
   the securing clamp is interrupted by a clamp opening in the circumferential direction; and
   at least one of the reinforcing rib and the holding rib is located opposite to the clamp opening.

4. The fluid conduit coupling according to claim 1, wherein at least one of (i) at least one securing web segment and (ii) at least one guide web segment is formed so as to be beveled, viewed in the radial direction of the fluid conduit coupling.

5. The fluid conduit coupling according to claim 1, wherein the securing web segments and the guide web segments are dimensioned different in size in the circumferential direction.

6. The fluid conduit coupling according to claim 1, wherein a securing protrusion for avoiding an incorrect assembly is formed on at least one of the securing clamp and on the two components.

7. The fluid conduit coupling according to claim 1, wherein the reinforcing rib is formed as a handle.

8. A charging device for a fresh air system of an internal combustion engine, comprising:
   a compressor inlet and a compressor outlet; and
   a fluid conduit coupling including a tubular body, a connecting piece, and a securing clamp;
   wherein the tubular body is part of a component being coupled to the compressor inlet or the compressor outlet or is attachable to the component;
   wherein the connecting piece is insertable coaxially into the tubular body;
   wherein the securing clamp is arranged on an outside of the tubular body, surrounds the tubular body over more than 180° in a circumferential direction, and is radially adjustable relative to the tubular body between a securing position, in which the connecting piece, which is inserted into the tubular body, cannot be pulled out of the tubular body, and a release position, in which the connecting piece, which is inserted into the tubular body, is able to be pulled out of the tubular body;
   wherein the connecting piece has, on an outside, a securing groove, which extends in the circumferential direction;
   wherein the tubular body has a securing slot, which extends in the circumferential direction and which is aligned radially to the securing groove when the connecting piece is inserted into the tubular body;
   wherein the securing clamp has, on an inside, a securing web, which sticks out radially to the inside, which extends in the circumferential direction, which, in the securing position, radially engages with the securing groove through the securing slot, and which, in the release position, does not radially engage with the securing groove;

wherein the tubular body has, on an outside, at least one guide groove, which extends in the circumferential direction;

wherein the securing clamp has, on the inside, at least one guide web, which sticks out radially to the inside and which, at least in the securing position, radially engages with the associated guide groove;

wherein the securing web is formed to be segmented in the circumferential direction and has several securing web segments;

wherein the at least one guide web is formed to be segmented in the circumferential direction and has several guide web segments;

wherein, viewed in an axial direction of the fluid conduit coupling, the securing web segments and the guide web segments do not overlap one another in the circumferential direction;

wherein the securing clamp is made without undercuts in an injection molding tool as an injection molded part made of plastic;

wherein the connecting piece is formed on at least one of the compressor inlet and the compressor outlet; and wherein, on the radial outside, the securing clamp is equipped with a reinforcing rib, which extends in the circumferential direction, wherein, viewed in the circumferential direction, the reinforcing rib has an extension, which decreases up to 180°, viewed from a maximal extension located opposite to a clamp opening in the circumferential direction.

9. A fresh air conduit of a fresh air system of an internal combustion engine, comprising:
a fluid conduit coupling including a tubular body, a connecting piece, and a securing clamp;
wherein the tubular body is formed on at least one end of the fresh air conduit;
wherein the connecting piece is insertable coaxially into the tubular body and is part of a component being coupled to the fresh air conduit or is attachable to the component;
wherein the securing clamp is arranged on an outside of the tubular body, surrounds the tubular body over more than 180° in a circumferential direction, and is radially adjustable relative to the tubular body between a securing position, in which the connecting piece, which is inserted into the tubular body, cannot be pulled out of the tubular body, and a release position, in which the connecting piece, which is inserted into the tubular body, is able to be pulled out of the tubular body;
wherein the connecting piece has, on an outside, a securing groove, which extends in the circumferential direction;
wherein the tubular body has a securing slot, which extends in the circumferential direction and which is aligned radially to the securing groove when the connecting piece is inserted into the tubular body;
wherein the securing clamp has, on an inside, a securing web, which sticks out radially to the inside, which extends in the circumferential direction, which, in the securing position, radially engages with the securing groove through the securing slot, and which, in the release position, does not radially engage with the securing groove;
wherein the tubular body has, on an outside, at least one guide groove, which extends in the circumferential direction;
wherein the securing clamp has, on the inside, at least one guide web, which sticks out radially to the inside and which, at least in the securing position, radially engages with the associated guide groove;
wherein the securing web is formed to be segmented in the circumferential direction and has several securing web segments;
wherein the at least one guide web is formed to be segmented in the circumferential direction and has several guide web segments;
wherein, viewed in an axial direction of the fluid conduit coupling, the securing web segments and the guide web segments do not overlap one another in the circumferential direction;
wherein the securing clamp is made without undercuts in an injection molding tool as an injection molded part made of plastic; and
wherein, on a radial outside, the securing clamp is equipped with a reinforcing rib, which extends in the circumferential direction, wherein, viewed in the circumferential direction, the reinforcing rib has an extension, which decreases up to 180°, viewed from a maximal extension located opposite to a clamp opening in the circumferential direction.

10. A securing clamp adapted for a use in a fluid conduit coupling, the securing clamp being arranged on an outside of a tubular body of the fluid conduit coupling, so that the securing clamp surrounds the tubular body over more than 180° in a circumferential direction, and is radially adjustable relative to the tubular body between a securing position, in which a connecting piece of the fluid conduit coupling, which is inserted into the tubular body, cannot be pulled out of the tubular body, and a release position, in which the connecting piece, which is inserted into the tubular body, is able to be pulled out of the tubular body, the securing clamp comprising:
on an inside, a securing web, which sticks out radially to the inside, which extends in the circumferential direction, which, in the securing position, radially engages with a securing groove on an outside of the connecting piece through a securing slot of the tubular body, and which, in the release position, does not radially engage with the securing groove;
on an inside, at least one guide web, which sticks out radially to the inside and which, at least in the securing position, radially engages with an associated guide groove of the tubular body; and
on a radial outside, a reinforcing rib, which extends in the circumferential direction, wherein, viewed in the circumferential direction, the reinforcing rib has an extension, which decreases up to 180°, viewed from a maximal extension located opposite to a clamp opening in the circumferential direction;
wherein the securing web is formed to be segmented in the circumferential direction and has several securing web segments;
wherein the at least one guide web is formed to be segmented in the circumferential direction and has several guide web segments;
wherein, viewed in an axial direction of the fluid conduit coupling, the securing web segments and the guide web segments do not overlap one another in the circumferential direction; and wherein the securing clamp is made without undercuts in an injection molding tool as an injection molded part made of plastic.

11. The securing clamp according to claim 10, wherein the reinforcing rib is formed as a handle.

12. The securing clamp according to claim 10, further comprising, on the radial inside, a holding rib, which extends in the circumferential direction.

13. The securing clamp according to claim 12, wherein:
the securing clamp is interrupted by a clamp opening in the circumferential direction; and
at least one of the reinforcing rib and the holding rib is located opposite to the clamp opening.

14. The securing clamp according to claim 10, wherein at least one of (i) at least one securing web segment and (ii) at least one guide web segment is formed so as to be beveled, viewed in the radial direction of the fluid conduit coupling.

15. The securing clamp according to claim 10, wherein the securing web segments and the guide web segments are dimensioned different in size in the circumferential direction.

\* \* \* \* \*